United States Patent [19]

Kuroiwa et al.

[11] Patent Number: 4,735,483

[45] Date of Patent: Apr. 5, 1988

[54] FIBER SCOPE

[75] Inventors: Takao Kuroiwa, Amagasaki; Sunao Oshibe, Nishinomiya; Atsushi Utsumi, Kawanishi; Toshiyuki Nakajima, Kawaguchi; Kohei Morisaki, Hyogo; Masatoshi Takamatsu, Hyogo; Shoichi Hamada, Hyogo; Junji Nakayama, Hyogo; Yoshiaki Kondo, Tokyo, all of Japan

[73] Assignees: Dainichi-Nippon Cables, Ltd., Hyogo; Mitsubishi Jukogyo Kabushiki Kaisha, Tokyo, both of Japan

[21] Appl. No.: 693,091

[22] Filed: Jan. 22, 1985

[30] Foreign Application Priority Data

Jan. 24, 1984 [JP] Japan .................. 59-11549

[51] Int. Cl.$^4$ ............................................. G02B 23/26
[52] U.S. Cl. ........................... 350/96.26; 350/96.25
[58] Field of Search ............... 350/96.24, 96.25, 96.26, 350/96.27, 96.28, 96.29, 96.30, 96.33, 96.34; 128/4, 6

[56] References Cited

U.S. PATENT DOCUMENTS

| 4,011,007 | 3/1977 | Phaneuf et al. | 350/96.25 |
| 4,272,156 | 6/1981 | Ishibashi et al. | 350/96.26 |
| 4,389,089 | 6/1983 | Strack | 350/96.26 |
| 4,475,539 | 10/1984 | Konomura | 128/6 |
| 4,504,114 | 3/1985 | Arrington | 350/96.34 |
| 4,575,185 | 3/1986 | Wentzell et al. | 350/96.26 |
| 4,615,583 | 10/1986 | Tsuno et al. | 350/96.33 |

FOREIGN PATENT DOCUMENTS

| 0046987 | 3/1982 | European Pat. Off. | 350/96.26 |
| 1961168 | 6/1971 | Fed. Rep. of Germany | 350/96.26 |
| 2232582 | 1/1973 | Fed. Rep. of Germany | 350/96.26 |
| 8119882 | 7/1981 | Fed. Rep. of Germany | 350/96.26 |
| 1215383 | 12/1970 | United Kingdom | 350/96.26 |
| 2030313 | 4/1980 | United Kingdom | 350/96.26 |
| 2011111 | 3/1982 | United Kingdom | 350/96.26 |

Primary Examiner—William L. Sikes
Assistant Examiner—Frank González
Attorney, Agent, or Firm—Burns, Doane, Swecker & Mathis

[57] ABSTRACT

A fiber scope of the side-viewing type includes an image guide and two light guides disposed on both sides thereof in an objective part. The fiber scope is suitable for the observation of the surface of long articles assembled with narrow gaps therebetween as in an assembly of nuclear fuel rods in a nuclear reactor and a wide field of view can be secured even if an object to be observed stands within a point-blank range of an objective part. Also a plurality of long articles can be simultaneously observed by the fiber scope or the observation can be carried out while moving the fiber scope in the scanning direction. If the fiber scope is used in a radioactive environment, highly radiation resistant optical fibers are used.

15 Claims, 7 Drawing Sheets

FIG.1 PRIOR ART
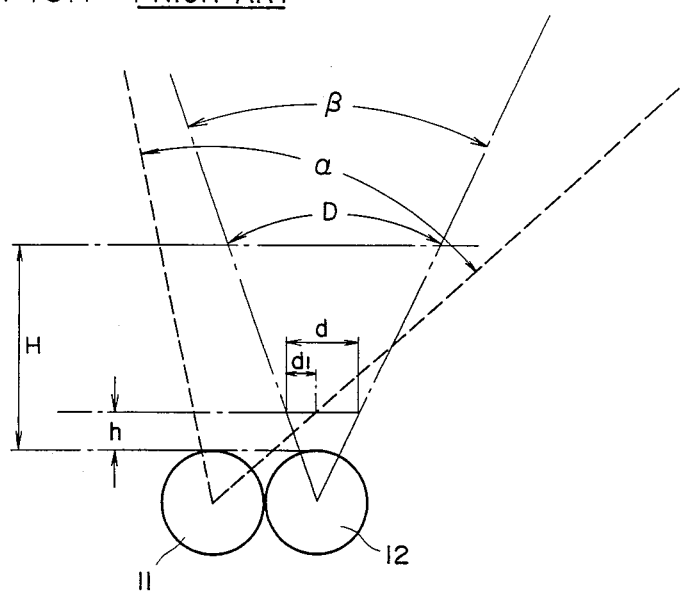
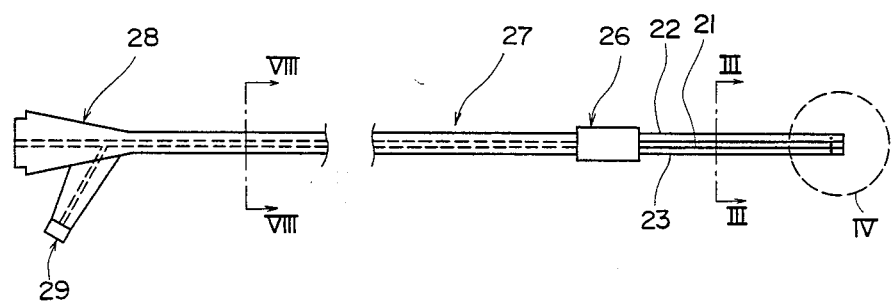
FIG.8
FIG.3
FIG.4
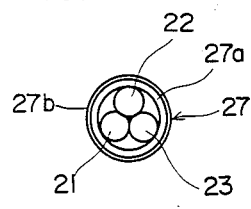
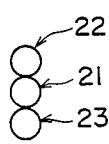
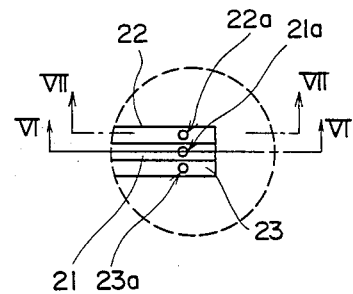

FIBER SCOPE

BACKGROUND OF THE INVENTION

1. Field of the Invention

The present invention relates to a fiber scope which is to be inserted into dark and narrow gaps formed by a plurality of long articles as in an assembly of nuclear fuel rods in a nuclear reactor to observe the circumference thereof. In particular, the present invention relates to a fiber scope which is capable of observing a wide range while standing within point-blank range of an objective part thereof.

2. Description of the Prior Art

FIG. 1 is a sectional view showing an objective part of a conventional side-viewing type fiber scope. Referring to FIG. 1, a light which is transmitted by a light guide 11 is radially projected at an angle to the longitudinal axis of the light guide 11 by way of a prism (not shown) and the like which is provided at a pointed head of the light guide. The angle $\alpha$ of the light projection from the light guide 11 is limited by an outside diameter of a probe tube which is provided at the pointed head of the light guide 11 to generally be about 60° at most. On the other hand, an image guide 12 is provided with a prism and a lens (not shown) at the pointed head thereof to catch a light from a range having a radial viewing angle $\beta$. The viewing angle $\beta$ is likewise limited by an outside diameter of a probe tube provided at the pointed head of the image guide 12 and is generally limited to an angle of about 45°. Since it is necessary that a reflected light from a range which is illuminated by a light projected by means of the light guide 11 be caught by way of the image guide 12, it is required to set the angles of the prisms of the light guide 11 and the image guide 12 so as to meet the requirement. However, when the gap between an object to be observed and a viewing part of the fiber scope is narrow, it is inconvenient that the light projecting range of the light guide 11 cannot entirely illuminate the field of view of the image guide even if the angle of the prism would be set an any angle. In other words, since $\alpha$, $\beta$ have the upper limit as described above, and since the light guide 11 is unable to be arranged excessively far away from the image guide 12 in respect of the limitation in uses, the following disadvantage appears:

In the case where a position which is spaced away from the image guide 12 by a distance H (for example about several hundreds mm) is to be observed, a field of view having a length D can be entirely illuminated due to the expansion of the light projecting range. However, in the case where the position which is spaced away from the image guide 12 by a distance h (for example several mm) which is sufficiently smaller than the distance H, merely a part (having a length of d') of the field of view having a length of d is illuminated. Accordingly, the observing range is narrow, and the inspecting efficiency is remarkably inferior.

Nuclear fuel rods in a nuclear reactor are positioned in a cooling pool in an arrangement having many narrow gaps thereamong with the rods arranged perpendicularly. Although nuclear fuel rods are generally constructed as a covering pipe containing nuclear fuel pellets, the covering pipe is periodically inspected to prevent radioactive fission products from escaping. A method of carrying out this observation in a simple manner has not been proposed. Although the conventional fiber scope has been applied to this observation, the gaps among nuclear fuel rods are narrow. Accordingly, the field of view effected by the projection from the light guide 11 is narrow and the inspecting efficiency is very low. As a result, the conventional fiber scope has never been practically used for this purpose.

OBJECTS OF THE INVENTION

It is a first object of the present invention to eliminate the problems incidental to the conventional fiber scope and to provide a fiber scope by which an entire field of view of an image guide can be illuminated so as to efficiently observe even in the case of observation within a point-blank range of an objective part in which the distance to an object to be observed is 2 mm or less.

It is a second object of the present invention to provide a fiber scope which can efficiently carry out the observation of an assembly of nuclear fuel rods.

It is a third object of the present invention to provide a fiber scope which can carry out the observation with a low light transmission loss even in a radioactive environment, whereby the fiber scope is capable of clearly observing without difficulty even if it is taken out of the radioactive environment through a long distance.

It is a fourth object of the present invention to provide a fiber scope which has a plurality of observing ranges or fields of view and which is superior in scanning efficiency.

It is a fifth object of the present invention to provide a fiber scope which can efficiently carry out an observational scanning and prevent an image guide, a light guide and the like from being injured in the scanning process.

It is sixth object of the present invention to provide a fiber scope which can be inserted into a narrow gap and efficiently carry out the observation of an object standing within a point-blank range of an objective part.

The above and further objects and features of the present invention will more fully be apparent from the following description with accompanying drawings.

BRIEF DESCRIPTION OF THE DRAWINGS

FIG. 1 is a schematic section view for illustrating an objective part and a field of view of the conventional fiber scope, according to the prior art, FIG. 2 is a schematic view showing a fiber scope according to the present invention, FIG. 3 is a view along the line III—III of FIG. 2, FIG. 4 is an enlarged view of a part shown in a circle IV designated by a broken line in FIG. 2, FIG. 8 is a schematic sectional view of FIG. 2 taken along a line VIII—VIII thereof.

DETAILED DESCRIPTION OF THE PREFERRED EMBODIMENTS

A fiber scope according to the present invention is fundamentally characterized as comprising one image guide and two light guides, wherein the image guide and the light guides are aligned at the objective part to provide the image guide between the light guides, and a viewing part and light-projecting parts for side viewing are formed at the substantially same longitudinal position of the image guide and light guides. At first, this will be described with reference to the drawings.

With reference to FIG. 2, an image guide 21 and light guides 22, 23 each consisting of optical fiber bundles which are described later are arranged at an objective part that is provided at a pointed head of a fiber scope so that the light guides 22, 23 may be positioned on both sides of the image guide 21, as shown in FIG. 3.

As shown in an enlarged view of an objective part (FIG. 4), a viewing part 21a of the image guide 21 and light projecting parts 22a, 23a of the light guides 22, 23 turn toward the vertical direction in both the longitudinal direction thereof and the direction in which they are aligned, that is, the positions thereof in the longitudinal direction are adapted to coincide with each other. It is not necessary for the viewing part 21a and the light projecting parts 22a, 23a to correctly turn toward the abovementioned vertical direction, and a field of view of the image guide 21 may be included in the light projecting ranges of the light guides 22, 23, as shown in FIG. 5.

Figure 5:
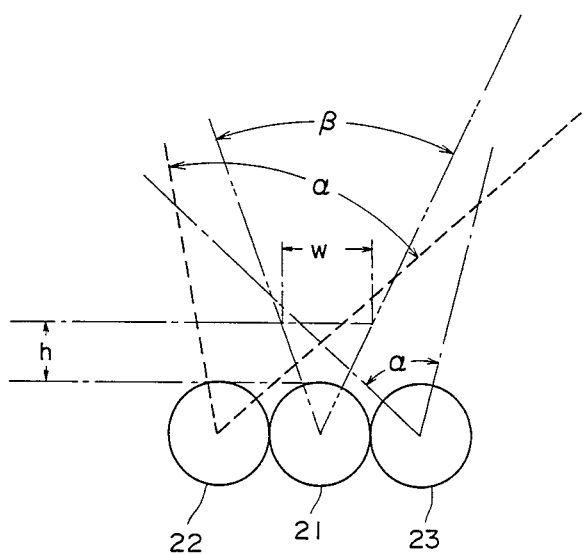
FIG. 5 is a schematic sectional view for illustrating a light projecting range and a field of view of an objective part of a fiber scope according to the present invention.

In FIG. 5, a viewing angle of the image guide 21 is designated as $\beta$ and a light projection angle of the light guides 22, 23 is designated as $\alpha$. The angles of prisms (refer to FIGS. 6 and 7) provided at the pointed heads of the image guide 21 and the light guides 22, 23 are suitably set and the directions of the viewing part 21a and the light projecting part 22a, 23a are determined so that a field of view having a length w at the point standing within the desired point-blank distance h of the image guide 21 may be included in the light projecting ranges of the light guides 22, 23 which are defined by the light projection angle $\alpha$.

In short, in a fiber scope according to the present invention, an insufficiency of illumination range for a field of view of an image guide by one of two light guides is made up by an illumination from the other. In addition, since it is desired that the illumination ranges by both the light guides 22, 23 be wide, the circumferential direction of the light projecting parts 22a, 23a are preferably biased toward the image guide 21 which is centrally positioned.

Figure 6:
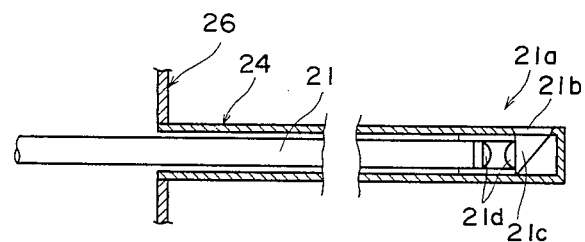
FIG. 6 is a schematic sectional view of an objective part of an image guide of a fiber scope according to the present invention as shown in FIG. 4 taken along a line VI—VI thereof.
Figure 7:
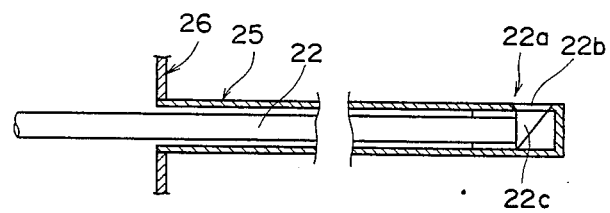
FIG. 7 is a schematic sectional view of an objective part of a light guide of a fiber scope according to the present invention as shown in FIG. 4 taken along a line VII—VII thereof.

Referring now to FIG. 6, and FIG. 7, the image guide 21 and the light guide 22 (which is the same as the light guide 23) are housed in probe tubes 24, 25 made of, for example, stainless steel. The viewing part 21a is constructed from a side viewing hole 21b of a suitable size provided on the circumferential surface of the pointed head part of the probe tube 24. A prism 21c is provided at the end of the image guide 21 with two planes of the prism facing to the side viewing hole 21b and to the end of the image guide 21, respectively, with a right angled part of the prism put therebetween. Focus lenses 21d are provided between the prism 21c and the end part of the image guide 21.

Also the light projecting part 22a is constructed to include a light projecting side hole 22b which is provided on the circumferential surface of the pointed head part of the probe tube 25 in a manner similar to that of the abovementioned side viewing hole 21b. A prism 22c is provided in the same manner as the prism 21c. The prism 21c and the prism 22c are fixed so that an angle formed between an optical axis and a reflecting plane of the image guide 21 and the light guide 22, respectively, may be 45° or other if necessary. The ends of the probe tubes 24, 25 are sealed up and the viewing part 21a and the light projecting parts 22a, 23a are brazed to each other so as to turn toward the above described direction. Simultaneously, the probe tubes 24, 25 are brazed to a junction box 26 so that they are aligned with one another. The above described prisms 21c, 22c and the lenses 21d 22d are fixed within the probe tubes 24, 25 by the use of suitable adhesives.

The image guide 21 is drawn out of the probe tube 24 at the junction box 26 and extends to an eyepiece part 28 through a flexible tube 27 which is connected with the junction box 26. The light guides 22, 23 likewise extend from the junction box 26 to a connector 29 which is connected with a light source through the flexible tube 27.

The image guide 21 and the light guides 22, 23 are arranged within the flexible tube 27 so that they all may internally touch the flexible tube 27 and at the same time contact each other, as shown in FIG. 8.

The flexible tube 27 is formed by covering a metallic spiral tube 27a with a covering 27b made of rubber or plastics and the like.

Although a bundle comprising a number of optical fibers, which is known per se, is used for each of the image guides 21 and for each of the light guides 22, 23, in situations where they are used in a radioactive environment, the following embodiment is preferably used so that a light transmission loss may not be increased under such an environment.

In this embodiment, a core is made of synthetic pure silica ($SiO_2$) having the purity of 99.99% containing 10 to 300 p.p.m. OH radical which can be obtained by a method in which $SiO_2$ is deposited from $SiCl_4$ by an argon plasma method or an oxygen plasma method, and the like. A clad is formed by synthetic pure silica with the dopant of fluorides (for example $SiF_4$) and/or boron compounds (for example $BCl_3$, $BF_3$) of the quantity required for the adjustment of the reflection factor.

A support layer made of natural silica is provided on the outside of the clad layer and the support layers of the optical fibers are fused to each other to form each of the image guides 21 and the light guides 22, 23.

In addition, the image guide 21 and the light guides 22, 23 may be formed by omitting the support layers and fusing the clads to each other.

Not only the image guide 21 and the light guides 22, 23 but also the prisms 21c, 22c and other optical systems having high radiation resistance are desirably used in such situations.

Figure 9:
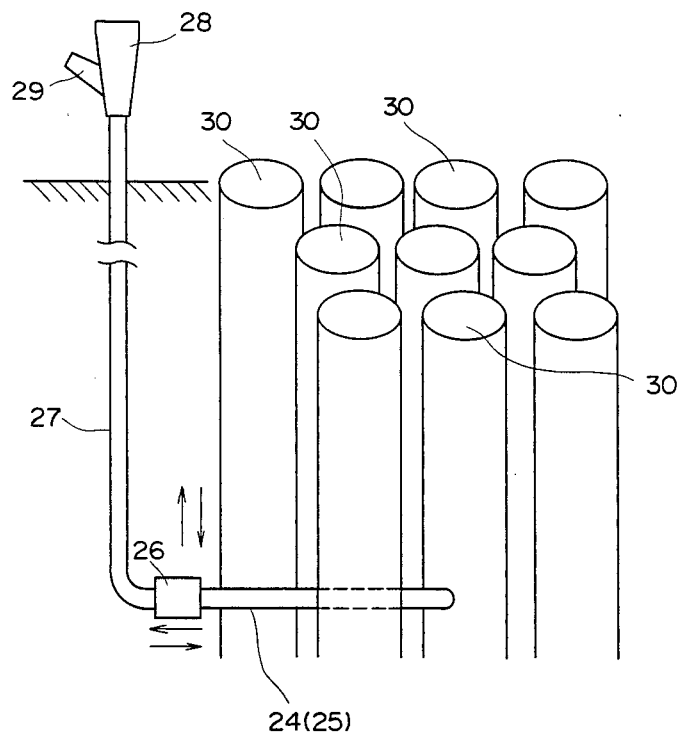
FIG. 9 is a schematic view showing a fiber scope observing an assembly of nuclear fuel rods.

FIG. 9 shows an arrangement in which an objective part, that is, the probe tubes, 24, 25 are inserted into a gap among an assembly of nuclear fuel rods 30 to observe the surface of one of nuclear fuel rods 30. The objective part is supported so as to be movable in three dimensional directions by means of a manipulator (not shown). The eyepiece part 28 and the connector 29 which is connected with a light source are drawn out of a radioactive environment. The viewing part 21a or the light projecting parts 22, 23 are allowed to go near the nuclear fuel rod 30 to be observed in the horizontal direction until the appointed position with observation being achieved by way of the eyepiece part 28. Subsequently an up and down scanning operation is carried out.

Since gaps among the nuclear fuel rods 30 are about 1.6 to 4 mm in size, the probe tubes 24, 25 are adapted to have an outside diameter of 1.5 to 3.0 mm which is slightly smaller than the size of the above described gaps. Thus, the probe tubes 24, 25 can be inserted into the gap among the nuclear fuel rods 30 without any difficulty. Although the distance from the image guide 21 to the surface of the nuclear fuel rods 30 is 2 mm or less, a field of view of the image guide 21 is illuminated by the light guides 22, 23, see FIG. 5, to be capable of carrying out the observation in a wide range.

Next, a second preferred embodiment of a fiber scope of the present invention will be described with reference to FIG. 10 which shows an objective part of the fiber scope. Three units, each of which includes the image guide 21 and the light guides 22, 23 disposed on both sides thereof in combination in the same manner as in the above described preferred embodiment, (hereinafter referred to as a fiber scope unit), are aligned in the direction in which the image guide 21 and the light guides 22, 23 are aligned. The number of the fiber scope units is not limited to 3. The fiber scope units 31, 32, 33 are aligned so that the longitudinal positions of the viewing part 21a and the light projecting parts 22a, 23a are different from each other. The distance of the shift t from one fiber scope unit to another may be optionally selected according to the uses of the fiber scope. For example, as shown in FIG. 11, where the expansion of a field of view in the circumferential direction of one nuclear fuel rod 30 is aimed, a value for t of 1 to 4 mm is sufficient. Thus, the number of hours required for the up and down scanning process of one nuclear fuel rod 30 can be reduced or the accuracy of the observation can be improved.

In addition, three pieces of the nuclear fuel rods 30 can be simultaneously observed at one time during an up and down scanning process by allowing the value of t to coincide with a pitch of the nuclear fuel rods 30.

Figure 10:
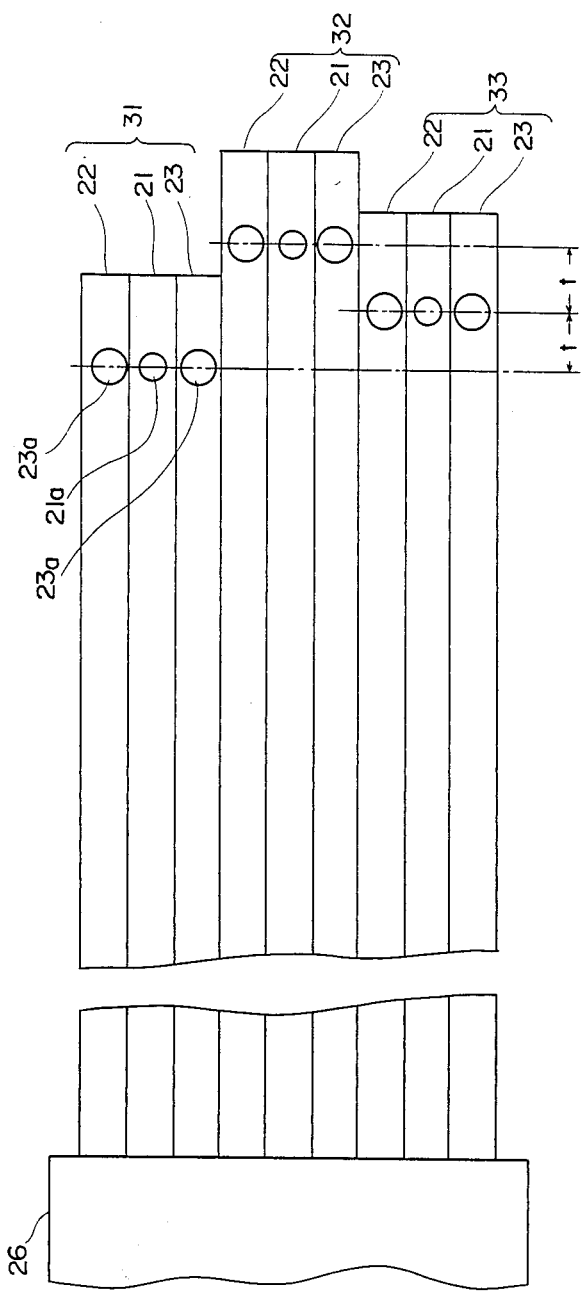
FIG. 10 is a schematic view showing an objective part in a second preferred embodiment according to the present invention.
Figure 11:
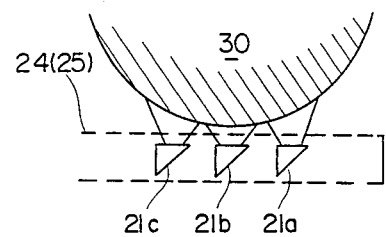
FIG. 11 is a view illustrating the same being used.
Figure 12:
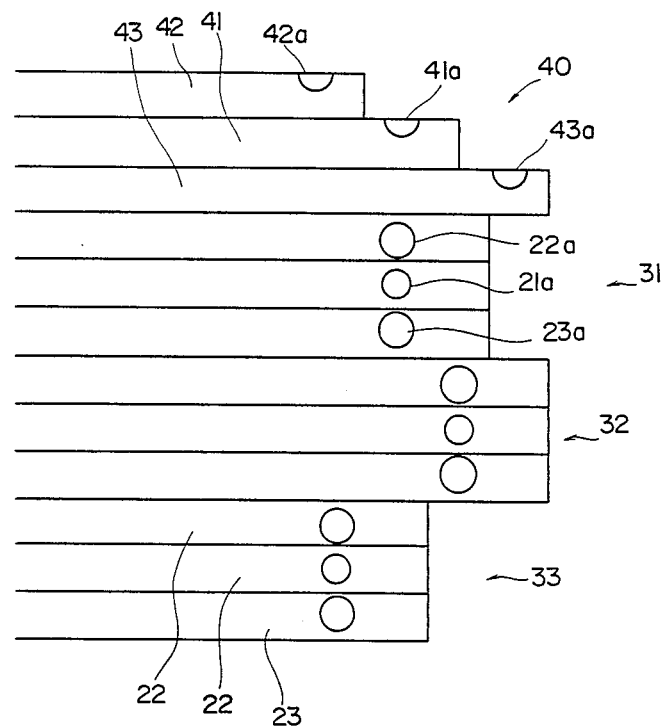
FIG. 12 is a schematic view showing an objective part in a third preferred embodiment according to the present invention.

Referring now to FIG. 12, a third preferred embodiment of a fiber scope according to the present invention has the three pieces of the fiber scope unit 31, 32, 33 aligned in the same manner as in FIG. 10 so that the viewing part 21a and the light projecting parts 22a, 23a may be different from each other in the longitudinal position. But in the embodiment of FIG. 12, an auxiliary fiber scope unit 40 is aligned outside of the fiber scope unit 31 so as to be coplanar with the three fiber scope units 31, 32, 33.

The auxiliary fiber scope unit 40 comprises a central image guide 41 and the light guides 42, 43 which are disposed on both sides thereof in a manner similar to the above described fiber scope units 31, 32, 33. The pointed head of the central image guide 41 is adapted, however, to draw in from the line of the pointed head of the light guide 43 nearmost the fiber scope unit 31 and the pointed head of the outermost light guide 42 is adapted to draw in from the line of the pointed head of the image guide 41. The viewing part 41a and the light projecting parts 42a, 43a, are turned toward the direction which is vertical to the longitudinal direction of the fiber scope and the observing direction of the fiber scope units 31, 32, 33 and outwardly. Viewing and light projection by each of image guide 41 and light guides 42, 43 is not disturbed due to the differences thereof in the position of the pointed head. In addition, the viewing part 41a and the light projecting parts 42a, 43a are positioned so that a field of view of the image guide 41 may be sufficiently illuminated by the light guides 42, 43.

In this preferred embodiment, in the case where the observation is carried out by longitudinally scanning an object, for example a nuclear fuel rod 30, also the existence of an obstacle in the scanning direction can be simultaneously observed, whereby the observation can be carried out without injuring an objective part. As described above, the scanning can be safely carried out in both directions by providing an auxiliary fiber scope unit 40 on both sides of the assembly of fiber scope units 31, 32, 33. Further, although one auxiliary fiber scope unit 40 is combined with a plurality of fiber scope units 31, 32, 33 in the above described preferred embodiment, it goes without saying that an auxiliary fiber scope unit 40 can be combined with only one fiber scope unit, as shown in FIGS. 2 to 7.

Figure 13:
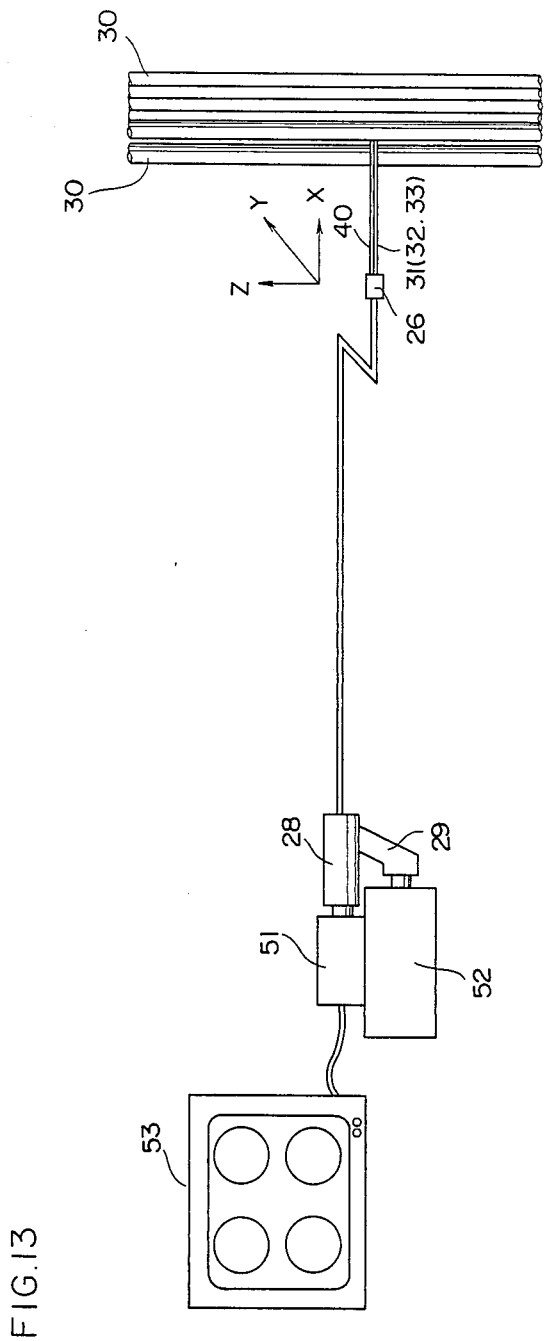
FIG. 13 is a schematic view illustrating the same being used.

Referring now to FIG. 13, in the situation in which the nuclear fuel rods 30 are observed by means of the combination of the auxiliary fiber scope unit 40 with the fiber scope units 31, 32, 33, the fiber scope units 31, 32, 33, 40 are inserted into gaps among the nuclear fuel rods 30. The junction box 26 which is relatively nearby the pointed heads of the fiber scope units 31, 32, 33, 40 is adapted to be movable in the three dimensional directions of X-Y-Z by means of a manipulator (not shown). The viewing part 21a of each of the fiber scope units 31, 32, 33 is positioned so as to face to the desired nuclear fuel rod 30, and be moved up and down.

The fiber scope units 31, 32, 33, 40 are connected with a common eyepiece part 28 and a common connector 29 connected with a light source. The eyepiece part 28 is connected with an image receiving apparatus 51 such as TV camera, and the connector 29 is connected with a light sourc 52. The image receiving apparatus 51 is connected with a monitor 53 on which images taken by the fiber scope units 31, 32, 33 are indicated. In this preferred embodiment, three images taken by the three fiber scope units 31, 32, 33 and one image taken by the auxiliary fiber scope unit 40 can be simultaneously seen.

In addition, such a construction, in which the fiber scope units 31, 32, 33, 40 are connected with the image receiving apparatus 51 and the light source 52 and an objective part is adapted to move by means of a manipulator, can be applied also to the above described first and second preferred embodiments.

Although the TV camera 51, the light source 52, the monitor 53 and the like are placed nearby an observer standing outside a radioactive environment in such a construction, in the case where an image guide and light guides consisting of optical fibers as described above are used, a light transmission loss is small. Accordingly, a distinct image can be obtained even if an image guide and the light guides are taken about a long distance.

As the present invention may be embodied in several forms without departing from the spirit of essential characteristics thereof, the present embodiment is, therefore, illustrative and not restrictive, since the scope of the invention is defined by the appended claims rather than by the description preceding them, and all changes that fall within meets and bounds thereof are, therefore, intended to be embraced by the claims.

What is claimed is:

1. A fiber scope comprising:
a plurality of fiber scope units, each unit being provided with one image guide and two light guides, wherein said image guide and said light guides are aligned at one end there of at an objective part to dispose said image guide between said light guides, each of said fiber scope units having a viewing part and two light-projecting parts for side viewing formed at substantially the same longitudinal position of said image guide and of said light guides at said objective part of each of said fiber scope units, the viewing part and said two light-projecting parts of each fiber scope unit being aligned in the direction in which said image guide and said light guides are aligned, and perpendicular to a longitudinal direction of said image guide and said to light guides at said objective part, the viewing part and the light-projecting parts of each fiber scope unit being positioned at a different longitudinal position of said fiber scope.

2. A fiber scope as set forth in claim 1, wherein each of said image guide and said light guides consists of a bundle of optical fibers which comprises a core made of synthetic pure silica, and a clad made of synthetic pure silica with a dopant of fluorides and/or boron compounds.

3. A fiber scope as set forth in claim 2, wherein said optical fibers comprise a support layer as an outside layer of said clad, and wherein said support layers are fused to each other.

4. A fiber scope as set forth in claim 2, wherein said clads of optical fibers are fused to each other.

5. A fiber scope comprising:
a main fiber scope unit which comprises one image guide and two light guides wherein said image guide and said light guides are aligned at an objective part of said main fiber scope unit to dispose said image guide between said light guides, said main fiber scope unit having a viewing part of said image guide and light-projecting parts of said light guides arranged for side viewing and formed at substantially the same longitudinal position of said image guide and of said light guides, and an auxiliary fiber scope unit which comprises one image guide and two light guides wherein said image guide and said light guides are aligned at an objective part of said auxiliary fiber scope unit to dispose said image guide between said light guides, said auxiliary fiber scope unit having a viewing part of said image guide and light-projecting parts of said light guides arranged for side viewing and formed at substantially the same longitudinal position of said image guide and of said light guides, and wherein the direction of the field of view of said image guide of said auxiliary fiber scope unit and the light-projecting ranges of said light guides of said auxiliary fiber scope unit are oriented radially thereof and generally coplanar with the aligned direction of the light guides and the viewing part of said auxiliary fiber scope unit and wherein said field of view of said auxiliary fiber scope unit is contained in said light projecting ranges of said light-projecting parts of said auxiliary fiber scope unit, wherein said main fiber scope unit and said auxiliary fiber scope unit are placed side by side in the same place so that said main fiber scope unit is not substantially contained in the field of view of said auxiliary fiber scope unit.

6. A fiber scope as set forth in claim 5, further comprising an additional auxiliary fiber scope unit and wherein one of said auxiliary fiber scope units is disposed on each side of said main fiber scope unit.

7. A fiber scope as set forth in claim 5, wherein a plurality of said main fiber scope units are arranged side by side one another and said viewing part and said light-projecting parts of each of said main fiber scope units is positioned at a different longitudinal position along a longitudinal direction of said fiber scope.

8. A fiber scope as set forth in claim 7, wherein each of said image guide and said light guides consists of a bundle of optical fibers which comprises a core made of synthetic pure silica, and a clad made of synthetic pure silica with a dopant of fluorides and/or boron compounds.

9. A fiber scope as set forth in claim 8, wherein said optical fibers comprise a support layer as an outside layer of said clad, and wherein said support layers are fused to each other.

10. A fiber scope as set forth in claim 8, wherein said clads of optical fibers are fused to each other.

11. A fiber scope comprising:
a fiber scope unit which comprises one image guide and two light guides wherein said image guide and said light guides are aligned at an objective part of said fiber scope unit to dispose said image guide between said light guides, said fiber scope unit having a viewing part of said image guide and two light-projecting parts of said light guides for side viewing formed at substantially the same longitudinal position of said image guide and of said light guides, an image receiving apparatus which is connected with an eyepiece portion of said image guide, a light source connected with an end of said light guides opposite the end of the fiber scope unit having the objective part, and a manipulator for moving said objective part of said fiber scope unit in three dimensional directions.

12. A fiber scope comprising:
a plurality of fiber scope units, each unit being provided with one image guide and with two light guides, wherein said image guide and said light guides are aligned at an objective part of each fiber scope unit to dispose said image guide between said light guides, said fiber scope units also including a viewing part and two light-projecting parts for side viewing formed at substantially the same longitudinal position of said image guide and of said light guides, the viewing part and said light-projecting parts of each fiber scope unit being aligned in the direction in which said image guide and said light guides are aligned, and said viewing part and said light-projecting part of each fiber scope unit being positioned at a different longitudinal position of said fiber scope, an image receiving apparatus which is connected with an eyepiece portion of said image guide, a light source connected with an end of said light guides and opposite the end of the fiber scope unit having the objective part, and a manipulator for moving said objective part of said fiber scope unit in three dimensional directions.

13. A fiber scope comprising:

a main fiber scope unit which comprises one image guide and two light guides, wherein said image guide and said light guides are aligned at an objective part of said main fiber scope unit to dispose said image guide between said light guides, said main fiber scope unit having a viewing part of said image guide and light-projecting parts of said light guides arranged for side viewing and formed at substantially the same longitudinal position of said image guide and of said light guides, an auxiliary fiber scope unit which comprises one image guide and two light guides, wherein said image guide and said light guides are aligned at an objective part of said auxiliary fiber scope unit to dispose said image guide between said light guides, said auxiliary fiber scope unit having a viewing part of said image guide and light-projecting parts of said light guides arranged for side viewing and formed at substantially the same longitudinal position of said image guide and of said light guides, and wherein the direction of the field of view of said image guide of said auxiliary fiber scope unit and the light-projecting ranges of said light guides of said auxiliary fiber scope unit are oriented radially thereof and generally coplanar with the aligned direction of the light guides and the viewing part of said auxiliary fiber scope unit and wherein said field of view of said auxiliary fiber scope unit is contained in said light projecting ranges of said light projecting parts of said auxiliary fiber scope unit, each of said main fiber scope units and each of said auxiliary fiber scope units being placed side by side in the same plane so that each of said main units is not substantially contained in the field of view of one of said auxiliary fiber scope units, an image receiving apparatus which is connected with an eyepiece portion of said image guide, a light source connected with an end of said light guides opposite the end of the fiber scope unit having the objective part, and a manipulator for moving said objective part of said main and said auxiliary fiber scope units in three dimensional directions.

14. A fiber scope as set forth in claim 13, wherein one of said auxiliary fiber scope units is disposed on each side of said main fiber scope unit.

15. A fiber scop- as set forth in claim 13, wherein each of a plurality of said main fiber scope units is placed side by side with one another and wherein said light-receiving part and said light-projecting parts of each of said main fiber scope units is positioned at a different longitudinal position of said main fiber scope unit.

* * * * *